United States Patent [19]

Soderquist

[11] Patent Number: 5,524,922

[45] Date of Patent: Jun. 11, 1996

[54] ENERGY DISSIPATION FEATURES IN AIR BAG CLOUSURES

[75] Inventor: Quin Soderquist, South Weber, Utah

[73] Assignee: Morton International, Inc., Chicago, Ill.

[21] Appl. No.: 207,974

[22] Filed: Mar. 8, 1994

Related U.S. Application Data

[62] Division of Ser. No. 79,486, Jun. 18, 1993, Pat. No. 5,339,060.

[51] Int. Cl.$^6$ ................................................. B60R 21/16
[52] U.S. Cl. .................. 280/728.3; 280/731; 280/728.1
[58] Field of Search ........................ 280/728 B, 731, 280/732, 728 R, 750

[56] References Cited

U.S. PATENT DOCUMENTS

| | | | |
|---|---|---|---|
| 3,622,176 | 11/1971 | Byer | 280/150 |
| 4,334,699 | 6/1982 | Patzelt et al. | 280/731 |
| 4,752,083 | 6/1988 | Honda | 280/731 |
| 4,878,689 | 11/1989 | Mitzkus et al. | 280/731 |
| 4,964,652 | 10/1990 | Karlow | 280/731 |
| 5,002,307 | 3/1991 | Heidorn | 280/731 |
| 5,013,065 | 5/1991 | Kreuzer | 280/731 |
| 5,056,814 | 10/1991 | Shiraki et al. | 280/728 B |
| 5,060,971 | 10/1991 | Nanbu et al. | 280/731 |
| 5,064,217 | 11/1991 | Shiraki | 280/743 |
| 5,069,477 | 12/1991 | Shiraki | 280/731 X |
| 5,087,071 | 2/1992 | Wallner et al. | 280/743 |
| 5,125,683 | 6/1992 | Nakajima | 280/728 B X |
| 5,143,401 | 9/1992 | Zushi | 280/731 |
| 5,152,548 | 10/1992 | Zushi | 280/728 B |
| 5,167,427 | 12/1992 | Baba | 280/743 |
| 5,178,409 | 1/1993 | Hiramitsu et al. | 280/731 |
| 5,179,132 | 1/1993 | Mizuno et al. | 280/728 B X |
| 5,186,490 | 2/1993 | Adams et al. | 280/731 |
| 5,195,773 | 3/1993 | Sawada et al. | 280/728 |
| 5,203,586 | 4/1993 | Niwa et al. | 280/728 |
| 5,280,946 | 1/1944 | Adams et al. | 280/728 B X |
| 5,280,949 | 1/1994 | Manabe | 280/731 |
| 5,320,380 | 6/1994 | Hamada et al. | 280/728 B |

FOREIGN PATENT DOCUMENTS

| | | | |
|---|---|---|---|
| 0461276 | 12/1991 | European Pat. Off. | 280/7286 |
| 4151348 | 5/1992 | Japan | 280/728 B |

Primary Examiner—Margaret A. Focarino
Assistant Examiner—Christopher Ellis
Attorney, Agent, or Firm—Nick C. Kottis; Gerald K. White

[57] ABSTRACT

A closure for an air bag deployment opening is provided. The closure includes at least one integral reinforcement rib and/or appropriately thickened hinge section to prevent undesired tearing of the closure.

11 Claims, 5 Drawing Sheets

ENERGY DISSIPATION FEATURES IN AIR BAG CLOUSURES

This is a divisional application Ser. No. 08/079,486 filed on 18 Jun. 1993, now U.S. Pat. No. 5,338,060.

BACKGROUND OF THE INVENTION

This invention relates generally to inflatable restraint systems and, more particularly, to an improved closure for use with an installation of an inflatable cushion, commonly referred to as an air bag.

Safety restraint systems which self-actuate from an undeployed to a deployed state without the need for intervention by the operator, i.e., "passive restraint systems", and particularly those restraint systems incorporating inflatable bags or cushions, as well as the use of such systems in motor vehicles have been the subjects of much discussion as the desirability of the use of such passive restraint systems has gained general acceptance in the United States.

It is well known to protect a vehicle occupant using a cushion or bag that is inflated/expanded with gas, e.g., an "air bag", when the vehicle encounters sudden deceleration, such as in a collision. During deployment, the rapidly evolving gas with which the bag is typically filled is an inert gas, e.g., nitrogen. In such systems, the cushion is normally housed in an uninflated and folded condition to minimize space requirements. Upon actuation of the air bag system, gas is discharged from an inflator to rapidly inflate the bag. The cushion, upon inflation, serves to restrain the movement of the vehicle occupant as the collision proceeds. In general, such air bags are commonly designed to be inflated in no more than about 30–60 milliseconds.

Inflatable restraint systems have been devised for automotive vehicles in which one or more air bags are stored in one or more storage compartments within the vehicle. In general, an air bag provided for the protection of a vehicle driver, i.e., a driver side air bag, is stored within a housing mounted in a storage compartment located in the steering column of the vehicle. Whereas, an air bag for the protection of a front seat passenger, i.e., a passenger side air bag, is typically stored within a housing mounted in the instrument panel/dash board of the vehicle. In either case, the housing of such an air bag assembly generally has a cover or some form of closure panel member. The closure commonly includes a face portion which, in the standard state, provides closure to the assembly and which, upon activation of the assembly and initial bag deployment, typically forms one or more "doors" which form an opening through which the air bag will be deployed.

In order to reduce the likelihood of tampering with the system, the closure panel member is commonly designed so as to minimize the visual impression of the presence of the air bag and air bag deployment opening thereunder. Thus, such closure panel members are typically designed to match or otherwise be compatible with the interior design of the vehicle.

Also to this end, appearance or otherwise cosmetic problems such as read through and sink marks are sought to be avoided. Read through (e.g., where shapes or features on the backside of the closure can be relatively easily discerned from a viewing of the front side of the closure) and sink marks (e.g., where the closure has an undesired, lower or uneven outer surface) can result from processing. For example, when the closure is prepared by molding fabrication of a thermoplastic material, an uneven shrinkage of the closure material upon processing can result in read through and/or sink marks. Such uneven shrinkage can, for example, occur as a result of the item being processed having relatively widely varying thicknesses and thus varying processing time and condition requirements.

In practice, closure panel members are commonly designed so that the face portion of the closure can be torn or otherwise opened along predetermined lines as a result of the force exerted against the closure by way of the inflating air bag and, thus, form air bag release doors. To this end, the closure is typically pre-weakened, such as by perforating or reducing the thickness of the cover, for example, along such preformed tear lines, paths or seams, generally commonly referred to herein as "tear ways". Furthermore, primarily to facilitate manufacture and operation, the face portion of prior art closures are commonly of uniform thickness except for the tear ways such as described above. Upon formation, the doors commonly remain joined to the closure via one or more hinge sections which permit the doors to move allowing the air bag to deploy through the resulting opening.

The component parts of such closures, fabricated from the thermoplastic rubber SANTOPRENE (a trademark of Monsanto Company), commonly have the following thicknesses:

| PART | THICKNESS (mm) |
| --- | --- |
| Door | 2–3 |
| Tear ways | 0.4–1.1 |
| Hinge | 1.6–3 |

As will be appreciated, the air bag deployment process is of necessity a very rapid process and, at least partially as a result thereof, commonly results in the door or doors opening with such force and energy that the closure can tear in an undesired and/or uncontrolled manner, such as tearing outside of the tear way such as into or through the hinge section, joining an air bag deployment door with the assembly.

Such undesired and/or uncontrolled tearing of the closure can result in the air bag closure breaking into or forming separate pieces. For example, should the tearing action proceed through the hinge section joining the door to the balance of the closure and/or assembly, the air bag release door can become detached from the closure or the balance of the system installation. Such a fragment can then act as a projectile capable of damaging or hurting vehicle occupants.

Also, the manner in which a closure is torn can detrimentally affect the manner in which the air bag is inflated and the shape or form taken thereby, and thus result in inflation of the underlying air bag in a non-optimal manner.

Various approaches have been employed in an attempt to overcome the problem of such undesired tearing. Unfortunately, many of the approaches for minimizing undesired closure tearing are so burdensome as to limit the flexibility and freedom in the designing of closures for specific installations.

In one approach, a closure member made of plastic is strengthened or reinforced by embedding therein a secondary material such as a section of a highly tear resistant material. For example, U.S. Pat. Nos. 4,334,699 and 4,752,083 teach embedding a tear resistant band or a reinforcing element, respectively, in a rupturable cover. An alternative approach has been to vary or alter the shape, size, or dimensions of the tear ways in the closure. For example, U.S. Pat. No. 5,013,065 discloses the use of a rupturable cover having break lines of continuously increasing thickness. U.S. Pat. No. 3,622,176 discloses using V-shaped grooves along the fracture lines and hinge elements having rounded root grooves, so as to avoid fracture. U.S. Pat. No. 5,060,971 discloses using a cover whose thickness is specifically varied along the tear seam. Another example of such an approach is the use of a closure wherein the thickness of the tear ways is gradually increased as the longitudinal end of the tear way is approached.

Other or similar cover groove geometries are shown in other patents including U.S. Pat. Nos: 4,964,652; 5,002,307; 5,069,477; 5,087,071; and 5,143,401.

In addition, tear ways with graduated or steadily varying thickness have been used in an attempt to provide a more controlled tearing of the closure. While the utilization of designs having such tear ways of varying thickness typically may provide greater control over the closure opening process including the site of the initial opening, such designs generally increase the likelihood of certain undesirable forms of closure tearing, such as tearing outside of the tear way. For example, when a closure is undergoing tearing along a tear way and the tearing action reaches a point in the tear way at which there is an abrupt increase in the thickness of the tear way, the abrupt change in thickness can result in tearing outside of the tear way. In the case of a tear way of gradually increasing thickness, as the thickness of the tear way increases, the difference in thickness of material at the tear way and the adjacent sections of the face portion diminishes, increasing the likelihood of non-tear way tearing of the closure.

SUMMARY OF THE INVENTION

A general object of the invention is to provide an improved closure element for an air bag deployment opening of an inflatable restraint system.

A more specific objective of the invention is to overcome one or more of the problems described above.

The general object of the invention can be attained, at least in part, through a one piece closure element for an air bag deployment opening of an inflatable restraint system. Such a system is adapted to be integrated into a vehicle and includes an inflator device and a housing for accommodating a collapsed inflatable air bag. The closure element includes a mounting portion securable to the housing. The closure element also includes a face portion having therein tear ways adapted to tear under the influence of inflating of the air bag to define at least one air bag release door and a hinge section adapted to join the release door with the mounting portion, after the formation of the door. The hinge section includes at least one integral reinforcement attachment rib, adapted to prevent undesired closure tearing, further joining the door formed when the air bag is inflated with the mounting portion.

The invention further comprehends a one piece closure element for an inflatable air bag restraint module wherein the closure element includes an upper wall and a side wall extending downward from a periphery of the upper wall. The upper wall includes a break-open area defined by tear ways adapted to tear and form at least one door for releasing the air bag while leaving part of the peripheral area of the upper wall outside of the break-open area connected to the side wall when the air bag is expanded. The tear ways also define a hinge section adapted to join the door with the side wall. The hinge section includes a) a hinge area whereat hinging of the door occurs and b) a thickened portion extending between the hinge area to the side wall whereat the hinge section is joined thereto. The thickened portion is adapted to prevent undesired closure tearing.

The prior art fails to provide a closure for an air bag deployment opening that permits greater design flexibility while eliminating or reducing the likelihood of undesired closure tearing and/or closure fragmentation in such a controlled, cost-effective, and cosmetically appealing manner whereby the likelihood of closure deformations such as sink marks are reduced.

Other objects and advantages will be apparent to those skilled in the art from the following detailed description taken in conjunction with the appended claims and drawings.

BRIEF DESCRIPTION OF THE DRAWINGS

FIG. 4 in the drawings A, B, and C illustrates an air bag assembly deployment sequence showing a simplified air bag assembly having a closure in general accordance with the embodiment specifically illustrated in FIGS. 2 and 3.

FIG. 5 in the drawings A and B illustrates an enlarged cross sectional fragmentary view of the closure in accordance with the embodiment specifically illustrated in FIGS. 2–4. In FIG. 5A the closure is in a closed or just opened state (such as shown in FIG. 4A). In FIG. 5B the closure is in an open state with the attachment reinforcing ribs extended (such as shown in FIG. 4B).

For ease of illustration and discussion, like parts in both the attachment reinforcing rib embodiment (FIGS. 2–5) and thickened portion embodiment (FIGS. 6–7) are designated by the same reference numeral and where a part has been modified in some way between the two embodiments, the modified part in the embodiment illustrated in FIGS. 6–7 has been noted by the addition of a "'" to the reference numeral.

DETAILED DESCRIPTION OR THE INVENTION

The present invention, as is described in more detail below, provides an improved closure for an inflatable restraint system, e.g., for an air bag deployment opening of an air bag assembly. While the invention will be described with reference to a driver side inflatable restraint module assembly for automotive vehicles including vans, pick-up trucks, and particularly automobiles, it is to be understood that the invention also has applicability not only with other types or kinds of air bag module assemblies for automotive vehicles including passenger side assemblies, but also other types of vehicles including, for example, airplanes.

Referring to the drawings, FIGS. 1–5 are in reference to a first embodiment of the invention. FIG. I illustrates an air bag assembly, inflatable restraint system, generally designated 10. The system 10 includes a one piece closure element, in accordance with the invention and generally designated 12, for an air bag deployment opening (not shown). Such an opening occurs in properly actuated air bag assembly inflatable restraint systems.

The closure 12, as the closure panel members described above, is designed to tear or otherwise open along predetermined lines as a result of the force exerted on the closure by way of the inflating air bag and thus form air bag release doors. In this way, and such as in the event of a particular collision by a vehicle so equipped, the air bag will deploy through such an opening to provide desired cushioning to a specifically positioned occupant. Further, as described above with reference to such air bag assemblies for the protection of a vehicle driver, the assembly is situated in the steering wheel of the vehicle, e.g., automobile.

The closure of the invention preferably is a molded homogeneous member in that no secondary material reinforcements are molded into it. A high pressure injection molding material such as a thermoplastic, such as TPE, TPU, or TPO, for example, is preferred. A currently preferred material for use for the closures of the invention is a thermoplastic rubber such as SANTOPRENE.

The closure 12 includes an upper wall or face portion 14 having a top side 20 and a bottom side 22 (see FIGS. 2–5), a side wall mounting portion 24 including four locking arms 26(A–D), and an outer surface side wall 30. In this illustrated embodiment, the face portion 14 is shown as a substantially flat or planar member. It is to be understood, however, that the geometrical form of the closure and specifically the face portion thereof can be appropriately altered or shaped so as to better match or conform to a specific desired application location or site.

The locking arm mounting portions 26(A–D) are preferably independently moveable to facilitate mounting of the closure to a corresponding air bag assembly housing 32 (see FIG. 3), also referred to as a "reaction housing." The housing 32 is generally rectangular in shape and includes a bottom 34 and side wall portions 35.

It is to be understood that while the practice of the invention is not limited to use in conjunction with housings of particular shapes or made of particular materials of construction, because of a desire to practically reduce and/or minimize the cost and weight of the assembly, such housings are typically made of steel or, preferably, aluminum either in a formed, cast or extruded shape. It is to be further understood that the construction of the housing using other suitable materials of construction such as molded plastic, for example, are also contemplated.

The bottom 34 is adapted to permit the insertion of an inflator 38. A recurved rim 40 occurs at the extreme edge of the side wall portions 35. The mode of operation of the inflator and the manner of attaching the inflator form no part of the invention and, therefore, will not be further described herein.

Figure 3:
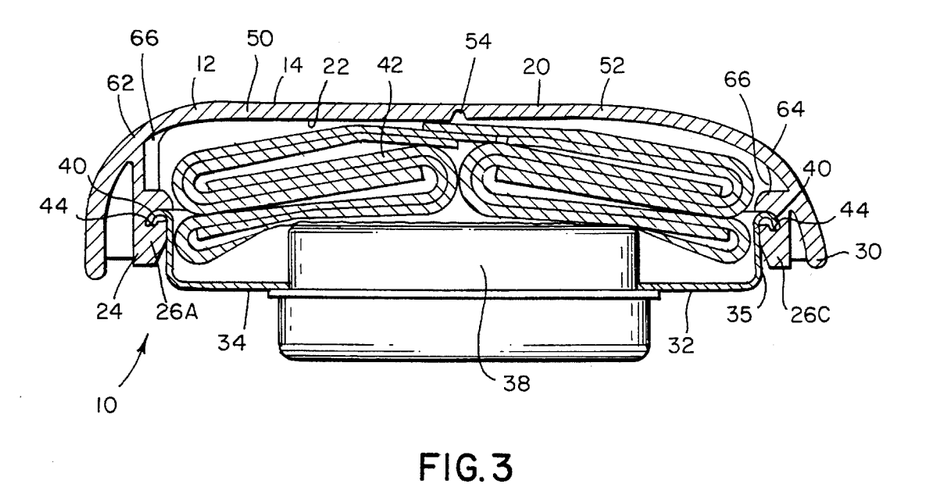
FIG. 3 is a simplified cross sectional view of the air bag assembly, inflatable restraint system shown in FIG. 1 taken substantially along the line 3—3 of FIG. 1 and viewed in the direction of the arrows, wherein the closure is in accordance with an embodiment of the invention utilizing attachment reinforcing ribs as in FIG. 2.

The closure 12 generally serves to enclose the housing 32 and an air bag 42 housed therein (see FIG. 3). Generally, the housing is shaped to correspond to the shape of the selected closure. Thus, in the case of a rectangular shaped closure, the housing generally also has a rectangular shape.

Moreover, it is to be understood that the practice of the subject invention in its broader aspects is not limited to use with any particular form or means of attachment of the closure to the housing. Thus, alternative forms or means of attachment as are known in the art, such as those that rely on the use of fastener devices such as screws or rivets, for example, can be used in a common manner to effect attachment of the closure to the housing.

Figure 1:
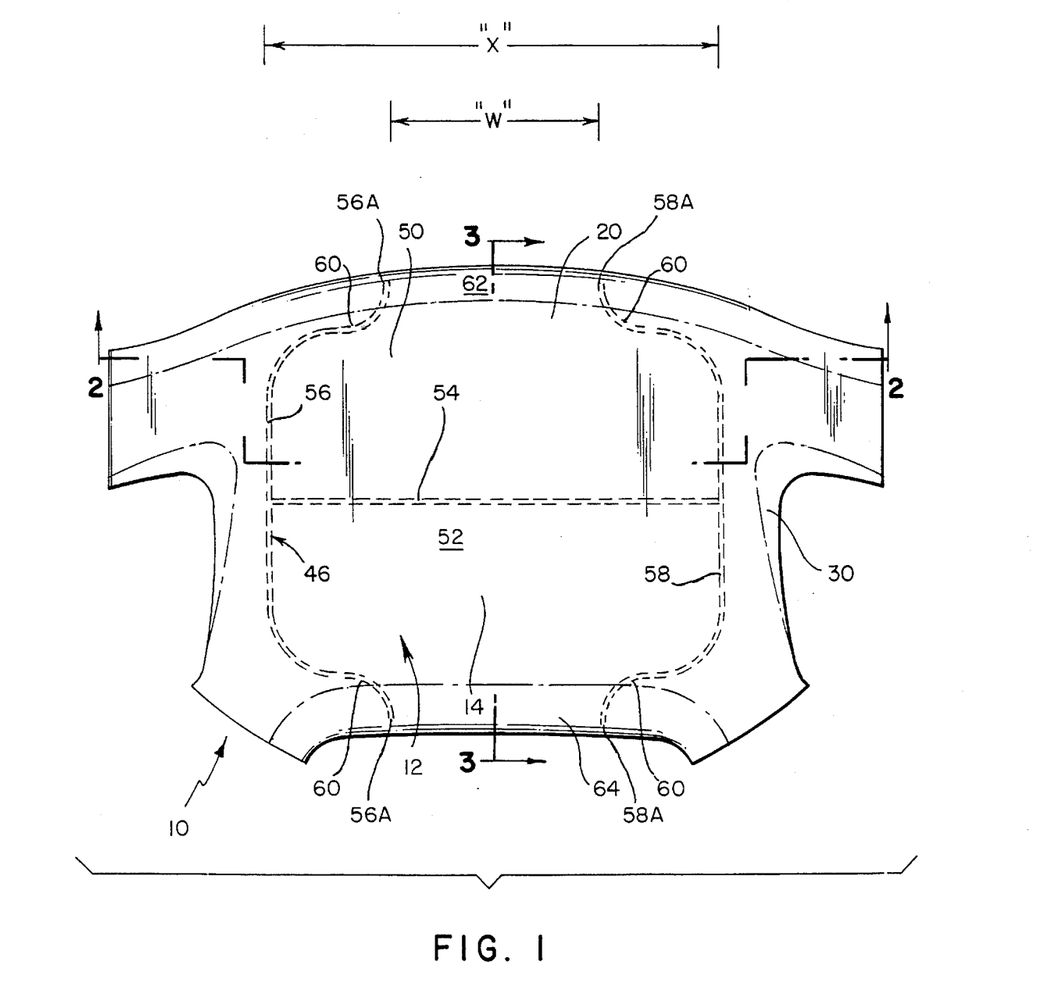
FIG. 1 is a simplified top view of an air bag assembly, inflatable restraint system, in accordance with the invention, applicable to both the attachment reinforcing rib and thickened portion embodiments.
Figure 2:
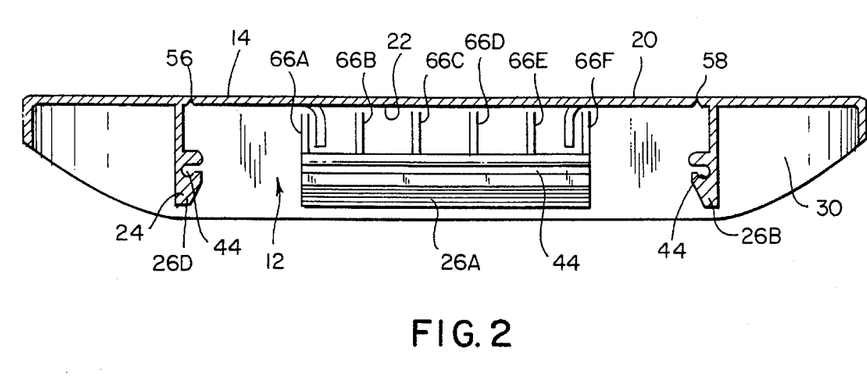
FIG. 2 is a simplified cross sectional view of the closure illustrated in FIG. 1 taken substantially along the line 2—2 of FIG. 1 and viewed in the direction of the arrows, wherein the closure is in accordance with an embodiment of the invention utilizing attachment reinforcing ribs.

As shown in FIGS. 2 and 3, the four locking arms 26(A–D) form two pairs of oppositely disposed locking arms, one set being arms 26A and 26C while the other set constituting arms 26B and 26D. For attachment of the closure to the housing, each of the locking arms 26(A–D) includes a notch 44 for receiving the rim 40.

It will be noted that the closure face 14 defines an array of tear ways 46. These tear ways are thin portions of the face 14 at which the closure 12 splits or otherwise tears when the air bag inflates thereagainst, thereby forming a first or upper hinged door 50 and a second or lower hinged door 52, respectively. The array of tear ways 46 are generally situated in the form of the letter H. The tear way array 46 includes: a tear way 54 which generally corresponds to the cross bar of the H and first and second side tear ways, 56 and 58, respectively, which generally correspond to the side bars of the H, as viewed in FIG. 1, with the end of each of the tear ways 56 and 58 designated 56A and 58A, respectively.

Towards each end of each of the side tear ways 56 and 58, a curved section 60 leads into a hinge section, 62 and 64, respectively, adjacent the locking arms 26A and 26C, respectively. After the tear ways 54, 56 and 58 have split or torn to form the doors 50 and 52, the hinge sections 62 and 64 are each adapted to join one of the release doors 50 and 52, respectively, with the mounting portion 24. In general, the hinge sections 62 and 64 are of a width "w" substantially less than the width "x" of the doors 50 and 52 at the tear way 54 (see FIG. 1), as closures so proportioned are generally better suited for providing a desired area for the deployment opening and contour shaping. In addition, the utilization of hinge sections of reduced width, such as are made more feasible as a result of the subject invention, provide greater flexibility in the design of specific, appropriate closures.

In the described closure, the lower door 52 has both a greater total mass and a narrower width of hinge section than the associated upper door 50. It will be appreciated, however, that the invention in its broader applications is not so limited to use in conjunction with closures having two doors (e.g., the closure may have one or more doors, as desired) let alone to closures having doors so proportioned and arranged (e.g., if there is more than one door, the doors can be in upper-lower, side-by-side, or other arrangement, or can have differing mass and/or hinge width, as desired).

Moreover, it is to be understood that the practice of the invention is not limited to use in conjunction with closures having tear ways in the form of the letter H or wherein the hinge sections are of a width substantially less than the width of the doors formed by the closure. That is, if desired, the invention can be practiced with closures with other appropriately shaped/formed tear ways and/or wherein the width of the hinge sections is substantially the same or greater than the width of the respective doors such as to satisfy the requirements for particular applications.

Now, specifically referring to FIGS. 2 and 3, the closure 12 includes six attachment reinforcing ribs 66 (for the locking arm 26A, each of the ribs 66 are individually designated by the addition of a letter, i.e., A–F, to the reference numeral). In a preferred embodiment, such as shown, the attachment reinforcing ribs 66 are formed integral with the closure 12 and are joined with a stable feature of the closure, e.g., the mounting portion 24, such as at the locking arm 26A and 26C, respectively. In general, "stable features" of the closure are those areas or components of the closure which are joined or attached to a rigidly/firmly secured component(s) of the inflatable restraint system. Also, as shown in FIG. 2, the outer ribs, i.e., ribs 66A and 66F, are positioned beyond the tear way ends 56A and 58A and thereby more readily result in the tearing action of the tear ways being ensnared within the rib-mounting block portion of the closure. As will be described in more detail below, such a closure with integral attachment reinforcing ribs greatly reduces and, preferably eliminates, the likelihood of undesired tearing of the closure such as can result in closure fragmentation.

To help better understand the invention reference will now be made to FIGS. 4 and 5. To facilitate understanding, FIG. 4 has been simplified such as by not showing the air bag or other assembly features which otherwise may obstruct viewing and comprehension of the closure element of the subject invention and the operation thereof.

Figure 4A:
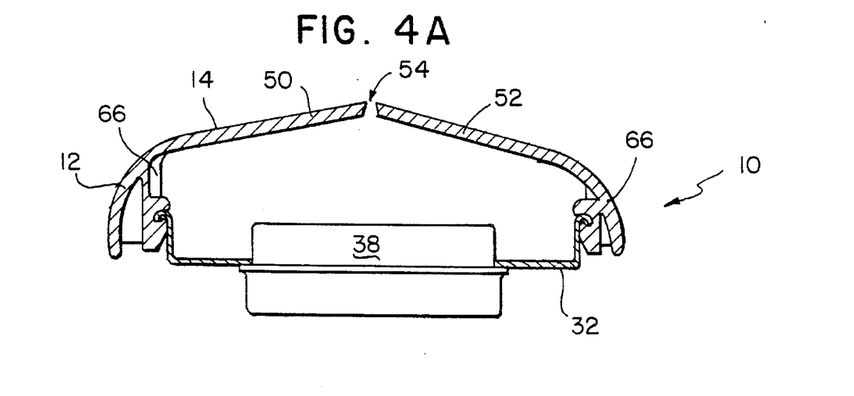
Figure 5A:
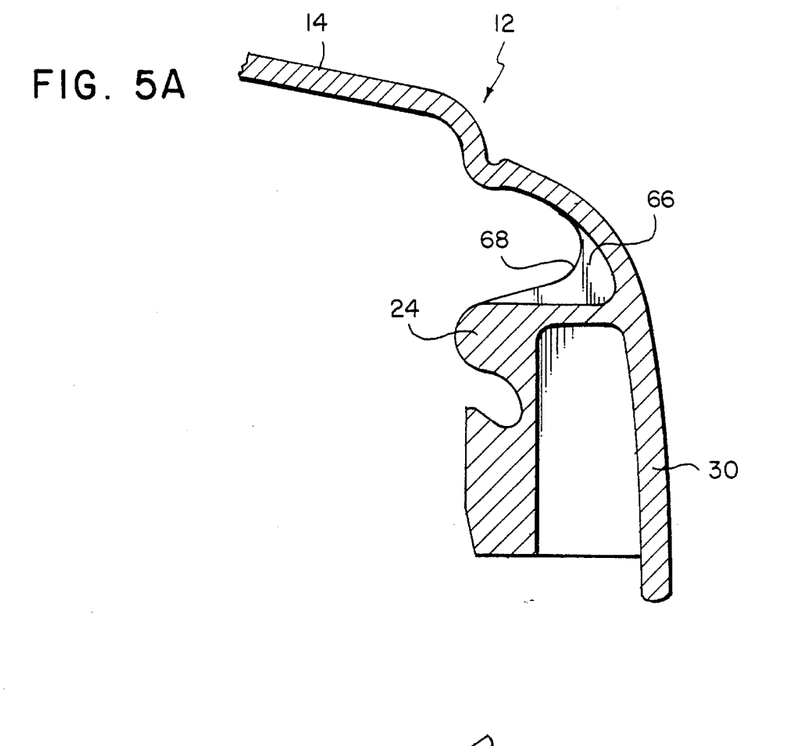
Figure 5B:
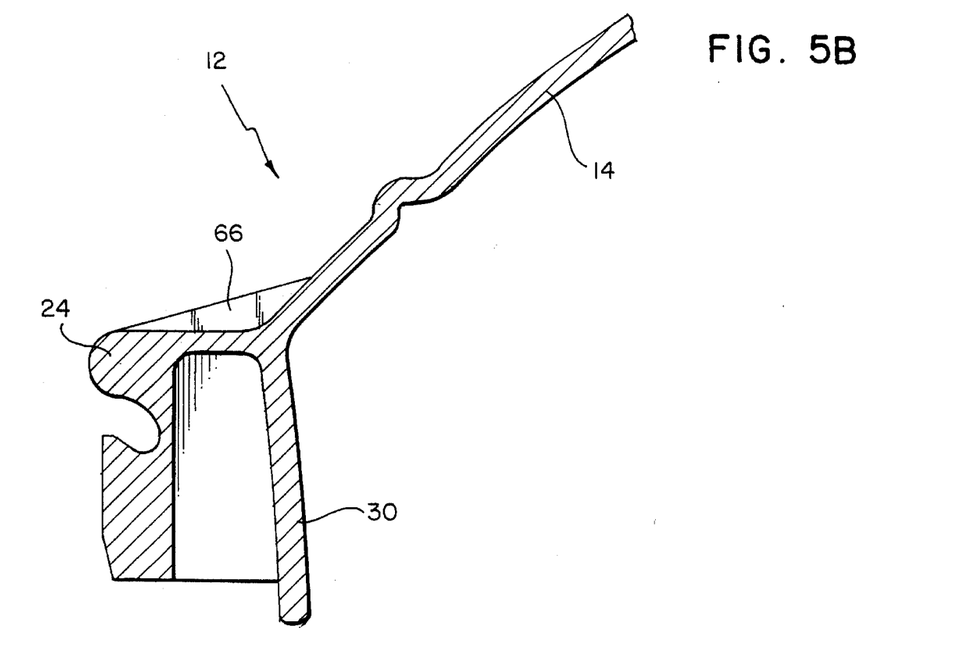

FIG. 4A shows the assembly 10 at the point in time during the deployment sequence when the tear way 54 of the closure 12 has just opened and the doors 50 and 52 have begun to rotate to an open position. Referring to FIG. 5A, at such point in time, the rib 66 exhibits curvature about the rib leading edge, generally designated by the reference numeral 68.

Figure 4B:
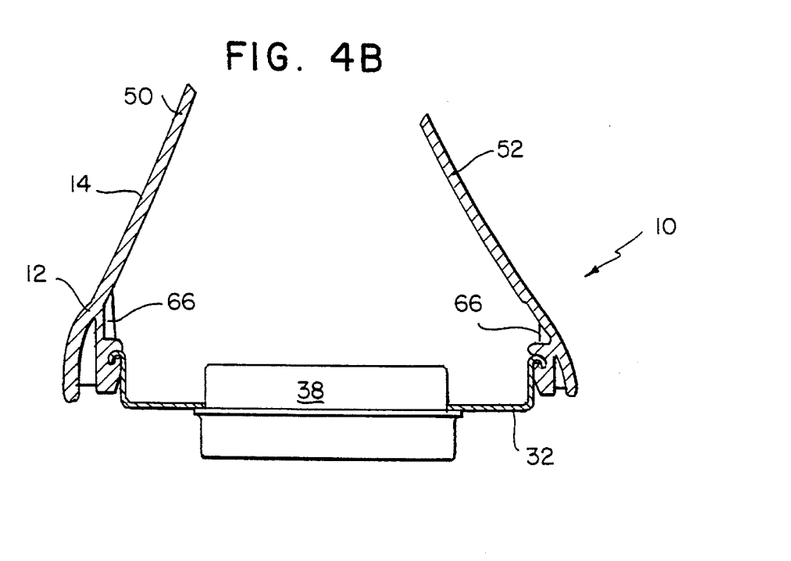

FIG. 4B shows the assembly 10 at the point in time of the deployment sequence when the doors 50 and 52 have opened (e.g., rotated) to a point where the door opening has extended the attachment reinforcing ribs 66 to a fully or near fully extended condition. As perhaps can more clearly be seen by reference to FIG. 5B, at such point in time, with the rib 66 now fully extended, the rib generally no longer exhibits the curvature referred to above in reference to FIG. 5A. By so extending the ribs, excess energy/force associated with the rapid opening of the doors begins to be safely and properly controlled, channeled, or dissipated, i.e., managed, prior to the tearing action associated with the opening of such a closure having advanced to the end of the designed tear way and/or into or through the hinge section or other undesired parts of the closure. Since excess energy/force is so managed over both a larger period of time and a wider span of material, over-tearing of the closure is reduced and preferably eliminated.

Figure 4C:
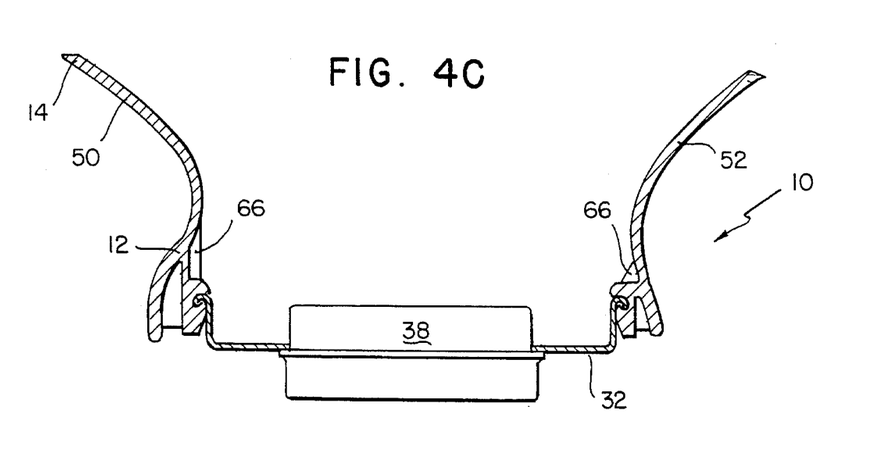

FIG. 4C shows the assembly 10 at a point in time of the deployment sequence as the doors 50 and 52 have continued to open/rotate while the attachment reinforcing ribs 66 are fully extended. As a result energy/force accompanying the door opening can be more appropriately dissipated so as to not result in undesired closure tearing, specifically tearing into or through the hinge section of the closure. Furthermore, the rib itself can, at least in instances where the tearing action has advanced to the rib, serve as a physical impediment to undesired closure cross tearing.

As an example, a specific version of the closure, as illustrated in FIGS. 2–5, could be made of the thermoplastic rubber SANTOPRENE with 6 attachment reinforcing ribs for each door. As shown in FIG. 2 and as described above, the two outer ribs, i.e., ribs 66A and 66F, are external to the tear seams at each of the respective hinge sections. In such an example, each rib could be of a width of 2 mm, a radius of curvature of 10 mm and spaced apart about 20–25 mm, with the length of each rib determined primarily as a result of the external contour of the closure.

Figure 6:
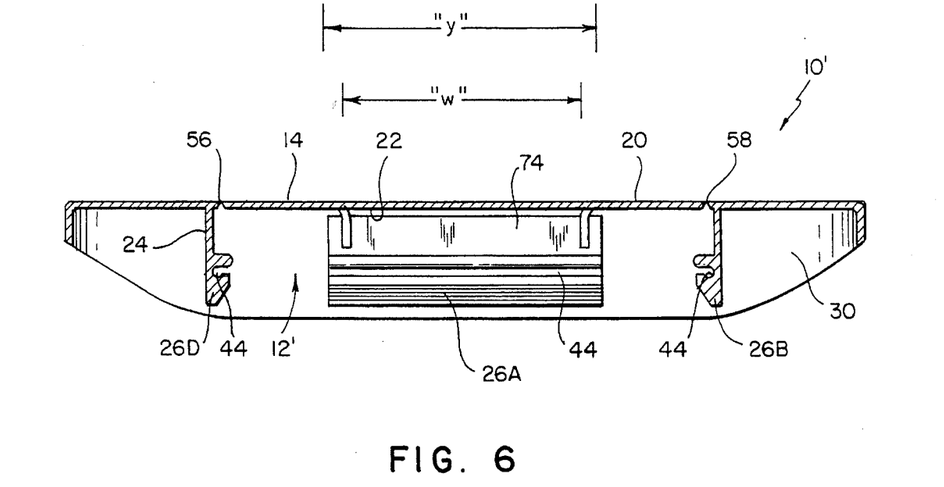
FIG. 6 is a simplified cross sectional view of the closure illustrated in FIG. 1 taken substantially along the line 2—2 of FIG. 1 and viewed in the direction of the arrows, wherein the closure is in accordance with an embodiment of the invention wherein selected portions of the closure hinge section(s) are made of increased thickness.
Figure 7:
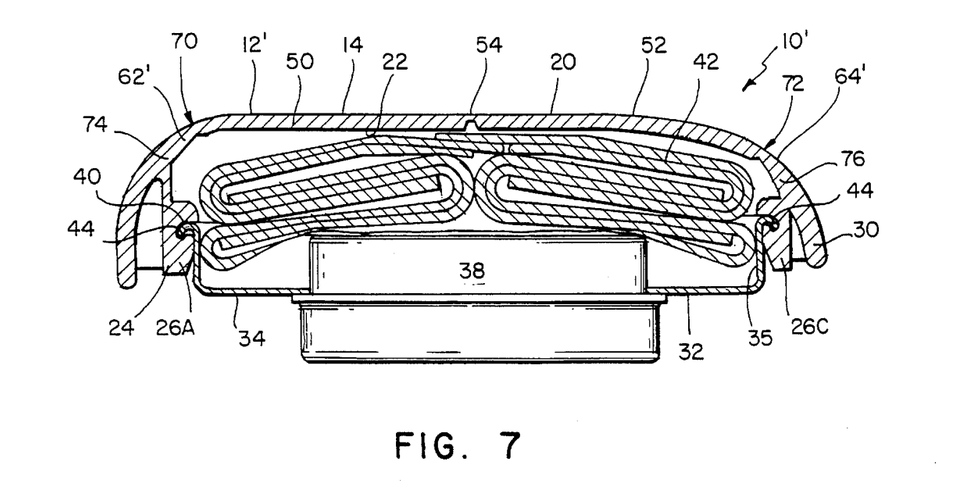
FIG. 7 is a simplified cross sectional view of the air bag assembly, inflatable restraint system shown in FIG. 1 taken substantially along the line 3—3 of FIG. 1 and viewed in the direction of the arrows, wherein the closure is in accordance with an embodiment of the invention wherein selected portions of the closure hinge section(s) are made of increased thickness, as in FIG. 6.

FIGS. 6 and 7 illustrate a second embodiment of the closure element of the invention. Similar to the embodiment of FIGS. 2–5, FIGS. 6 and 7 illustrate an assembly 10' including a closure 12' similar to the assembly 10 with the closure 12 described above but rather than attachment reinforcing ribs, the closure 12' utilizes selective thickening of portions of the closure hinge section to prevent undesired closure tearing, such as by effecting sufficient resistance to rotation of the door to prevent the tearing action associated with the opening of such a closure from advancing to the end of the designed tear way and/or into or through the hinge section or other undesired parts of the closure. To simplify discussion, those parts in the second embodiment, shown as like those with the above-described first embodiment, will not be further described in detail herein.

The hinge sections 62' and 64' each include a hinge area, 70 and 72, respectively, whereat the respective doors 50 and 52 hinge or rotate open. It is to be understood that the specific location of such hinge area or place of occurrence of such hinging action can be appropriately varied without departing from the invention. In a preferred embodiment, the hinge areas 70 and 72 are thinned areas, e.g., areas generally having a reduced thickness as compared to the door itself. The use of thinned hinge areas facilitates the greater control of the specific site at which the hinging or rotation of the door associated with opening will occur. That is, the site for such hinging or rotation will generally preferably occur in the vicinity of such a thinned hinge area. It is to be understood, however, that the practice of the invention in its broader terms is not limited to use in conjunction with doors having thinned hinge areas and that doors having alternative geometries can, if desired, be used.

The hinge sections 62' and 64' each also include a thickened portion 74 and 76, respectively, generally extending between the respective thinned areas, 70 or 72, and the side wall whereat the hinge section, 62' and 64', respectively, is joined. In the specifically illustrated embodiment, the thickened portions 74 and 76, respectively, generally extend from the vicinity of the hinge areas 70 and 72, respectively, to the locking arms, 26A and 26C, respectively, at the side wall whereat the hinge sections, 62' and 64', respectively, are joined. The thickness of each of the thickened hinge portions 74 and 76, respectively, gradually increases from the hinge areas 70 and 72, respectively, to the locking arms 26A and 26C, respectively.

In general, such thickened portions resist rotation of the respective door before the end of the tear way and hinge section are reached. That is, before the tearing action associated with the opening of the closure has advanced to the end of the designed tear way and/or into or through the hinge section or other undesired parts of the closure.

As an example, a specific version of the closure, as illustrated in FIGS. 6–7, could be made of the thermoplastic rubber SANTOPRENE wherein the doors are 2.4 mm thick; the thinned hinge area is 2 mm thick, 3 mm wide and extends the width "w" of the hinge; and the thickened hinge portion of each door is tapered to increase in thickness from the 2 mm adjacent the thinned hinge area to 3–4 mm adjacent the locking arm and of a length "y" that extends about 5 mm beyond each end of the width of the hinge.

Relative to the invention in general, factors to be considered in the design of the closures of the invention can include: inflator performance (e.g., rise rate, that is the change in inflator gas pressure output versus time), door mass and thickness, physical properties of the material used in the construction of the closure (particularly the tensile strength, elongation, and flex modulus of the material), closure contour, hinge width and thickness, and, to a lesser degree, tear way thickness.

For example, as will be appreciated, the use of inflators of relatively larger rise rates will, in practice, generally result in a closure design utilizing relatively wider and/or thicker hinge sections, the use or greater use of the described ribbing or a combination of these features. In addition, for a given inflator performance, an increase in the mass of the door will similarly, though generally to a lesser degree, result in a closure design utilizing relatively wider and/or thicker hinge sections, the use or greater use of the described ribbing or a combination of these features.

As a further example and assuming other factors remain constant, closure designs wherein the width or thickness of such door hinge sections are decreased can result in the use or increased use of the described ribbing. Similarly, closure designs wherein the width or thickness of such door hinge sections are increased can permit the use of doors of greater thickness and/or mass. Also, as the physical properties, e.g., tensile strength, elongation, and flex modulus, of the material of construction increases, a design having either doors of greater mass, less or no ribbing, narrower and/or thinner hinge sections or a combination thereof generally can be utilized. In addition, regarding closure contour, generally closures having a smaller or a more acute angle of curvature will, assuming other factors are constant, necessitate the use or further use of the described ribbing, wider and/or thicker hinges sections, and/or doors of less mass.

While not wishing to be bound to any particular theory of operation, it is theorized that such attachment reinforcing ribs and thickened portions of the hinge section adjacent the tear ways serve to dissipate the high force/energy of the doors, associated with the rapid deployment process. That is, these features serve to avoid advancing of the tearing action associated with the opening of the closure beyond the end of the designed tear way and/or into or through the hinge section or other undesired parts of the closure as well as to resist cover rotation and thus serve to dissipate the door opening force/energy, preferably prior to the door achieving a fully open position. In this way the likelihood of door tearing beyond the designed tear way path is greatly reduced and preferably eliminated.

It is to be understood that in the closure elements of the invention utilizing attachment reinforcing ribs, various interrelated parameters relating to such rib design and arrangement, e.g., parameters such as the number, thickness, spacing, curvature and length of the rib(s), can be appropriately varied to satisfy the needs for specific applications.

For example, in the practice of the reinforcing rib embodiment of the invention, a general equal spacing of ribs along the width of the hinge and extending generally at least about 3 mm from the respective mounting block stable feature (e.g., the respective locking arm) toward the respective door and hinge section has been effective.

In addition, rib curvature can reduce the possibility of the rib tearing away from the door. In general, it is preferable that the curvature of a respective rib be large enough to permit the closure doors to open to a point whereat the doors are normal to the pre-opening face of the closure before the rib has been extended such that the rib edge is straight. The rib curvature can be oval, parabolic, or otherwise curved allowing the rib edge to straighten during door rotation. In general, the ribs in the closure of the invention will begin to resist door rotation (begin dissipating energy) before the door has reached its fully open state, e.g., the ribs typically begin resisting door rotation as the door has opened 90° rather than the about 180° to 270° commonly associated with such doors being in a fully open state.

Additionally, the width of the rib(s) is generally preferably as great as the closure door and/or hinge thickness will permit without the occurrence of such appearance problems as sink marks and/or read through, while still providing the desired degree of flexibility in the closure, particularly by the respective doors and hinge sections.

Furthermore, as described in the examples below, in those closures in accordance with the invention which upon bag deployment form more than one door, the rib arrangement need not be the same for each door. For example, the ribs for one of the doors may differ in number, width, curvature and/or spacing as compared to the rib arrangement for another of the doors.

For specific applications, such design related parameters are determinable by one skilled in the art and guided by the teachings herein. For example, those skilled in the art will appreciate that in such a design one may reach a point of diminishing returns where, for example, the addition of one or more additional rib(s) or increasing the width of one or more of the ribs produces negative results such as the hinge area becoming so stiff that desired door rotation is retarded and/or the energy associated with the opening of the doors is not transferred into the stable feature, as desired.

In the closure elements of the invention utilizing the thickened portions of the hinge section, various interrelated parameters relating to such closure design, e.g., parameters such as the width and length of the thickened portions as well as the extent of thickening, can, for example, be appropriately varied to satisfy the needs for specific applications. As with the reinforcing rib embodiment, such design related parameters are determinable by one skilled in the art and guided by the teachings herein.

It is also to be understood that such an embodiment can, for example, be used alone or together with the above-described attachment reinforcing ribs. Further, such portions of increased thickness can be appropriately tapered, stepped, continuous about an extended area of the hinge portion (such as either of uniform or varying increased thickness) or in discrete segments (again, such as either of uniform or varying increased thickness) along the hinge portion, as desired.

The present invention is described in further detail in connection with the following examples which illustrate/simulate various aspects involved in the practice of the invention. It is to be understood that all changes that come within the spirit of the invention are desired to be protected and thus the invention is not to be construed as limited by these examples.

EXAMPLES

In the following examples, over forty (40) injection molded closures made of SANTOPRENE 101–87 material and having the below-identified dimensions and rib parameters, in accordance with the invention, were made.

| DOOR DIMENSIONS | | |
| --- | --- | --- |
| | UPPER DOOR | LOWER DOOR |
| MASS (grams) | 27 | 35 |
| THICKNESS (mm) | | |
| DOOR | 2.4 | 2.4 |
| TEAR WAY* | 0.5/0.8 | 0.5/0.8 |
| HINGE | 2.2 | 2.2 |
| HINGE WIDTH (mm) | 81.3 | 55.8 |

| RIB PARAMETERS | | |
| --- | --- | --- |
| RIBS | UPPER DOOR | LOWER DOOR |
| number | 4 | 5 |
| width (mm) | 2 | 2 |
| spacing (mm) | 18 | 11 |

*tear way thickness ranged from 0.5 mm, in the area where initial opening of the closure was desired, up to a thickness of 0.8 mm, at the end of the respective tear way.

As described above, each of the ribs included curvature and extended 6 mm from the respective locking arm towards the respective door.

It is noted that in view of the greater mass and narrow hinge section for the lower door, the ribs for use in conjunction with the lower door were more closely spaced and greater in number than the ribs for use in conjunction with the upper door.

PROCEDURE:

Each of these closures was tested using an inflator providing an inflator performance (rise rate) of 0.86 kPa/msec (0.125 psi/msec) in a 60 liter tank at 21° C. (room temperature) and wherein, to approximate operation under "hot" conditions, each closure was conditioned at +80° C. for 4 hours.

RESULTS:

Upper Door

No over/cross tearing beyond the end of the tear way was noted in the over 40 closures tested.

Lower Door

In the over 40 closures tested, no door detachment or major over/cross tearing (i.e., tearing of more than 0.25" in length) was noted and only occasional (i.e., less than 20% of the tested closures) experienced even minor over/cross tearing (i.e., tearing of up to 0.25" beyond the end of the tear way).

DISCUSSION:

As compared to similarly constructed closures (e.g., similar/same dimensions and material of construction) but which do not include the rib energy/force dissipation feature of the invention, the inclusion of such ribs in the closure results in a dramatic improvement in the ability of the closure to resist over/cross tearing.

It is to be understood that the discussion of theory, such as the discussion of the energy/force associated with the opening of the doors as the cause or source of such a closure or closures being subjected to continued, undesired tearing, for example, is included to assist in the understanding of the subject invention and is not limiting to the invention in its broad application.

The foregoing detailed description is given for clearness of understanding only, and no unnecessary limitations are to be Understood therefrom, as modifications within the scope of the invention will be obvious to those skilled in the art.

What is claimed is:

1. A one piece closure element for an inflatable air bag restraint module, said closure element comprising a homogeneous molded plastic member comprising:

an upper wall and a side wall extending downward from a periphery of the upper wall, said upper wall having a break-open area defined by tear ways adapted to tear and form at least one door for releasing the air bag while leaving part of the peripheral area of the upper wall outside of the break-open area connected to the side wall when the air bag is expanded, said side wall including a thickened mounting portion for mounting said closure element to a housing of said module, said tear ways also defining a hinge section adapted to join said door with said side wall, said hinge section including;

a) a hinge area whereat hinging of said door occurs and b) a thickened portion separate from said thickened mounting portion extending between said hinge area to said side wall whereat said hinge section is joined thereto, said thickened portion being adapted to prevent undesired closure tearing.

2. The closure element of claim 1 wherein said thickened portion is adapted to resist rotation of said door prior to the tearing action associated with opening of said closure having advanced to the end of the tear way and into said hinge section.

3. The closure element of claim 1 wherein said tear ways comprise thin regions in said face portion and form a generally H-shaped pattern defining at least two air bag release doors.

4. In an inflatable restraint system including an inflator device and a housing for accommodating a collapsed inflatable air bag, said system having an air bag opening wherethrough the air bag is deployable, the closure element of claim 14 wherein the thickness of the thickened portion is proportional to the rise rate of said inflator device.

5. The closure of claim 1 wherein the thickness of said thickened portion is proportional to the mass of said door.

6. The closure of claim 1 wherein the thickness of said thickened portion is inversely proportional to the tensile strength of the material of which said closure element is constructed.

7. A one piece closure element for an air bag deployment opening of an inflatable restraint system adapted to be integrated into a vehicle with the system including an inflator device and a housing for accommodating a collapsed inflatable air bag wherein said closure element comprises a homogeneous molded plastic member comprising:

an upper wall and a side wall extending downward from a periphery of the upper wall, said upper wall having a break-open area defined by tear ways adapted to tear and form at least one door for releasing the air bag while leaving part of the peripheral area of the upper wall outside of the break-open area connected to the side wall when the air bag is expanded, said tear ways also defining a hinge section adapted to join said door with said side wall, said hinge section including;

a) a hinge area whereat hinging of said door occurs, said hinge area being of a thinner thickness as compared to said door and b) a thickened portion extending between said hinge area to said side wall whereat said hinge section is joined thereto, said thickened portion being adapted to prevent undesired closure tearing and to resist rotation of said door prior to the tearing action associated with opening of said closure having advanced to the end of the tear way and into said hinge section.

8. The closure element of claim 7 wherein the thickness of said thickened portion is proportional to the rise rate of the inflator device.

9. The closure of claim 7 wherein the thickness of said thickened portion is proportional to the mass of said door.

10. The closure of claim 7 wherein the thickness of said thickened portion is inversely proportional to the tensile strength of the material of which said closure element is constructed.

11. A one piece closure element for an air bag deployment opening of an inflatable restraint system adapted to be integrated into a vehicle with the system including an inflator device and a housing for accommodating a collapsed inflatable air bag wherein said closure element comprises a homogeneous molded plastic member comprising:

an upper wall and a side wall extending downward from a periphery of the upper wall, said upper wall having a break-open area defined by tear ways comprising thin regions in said face portion and forming a generally H-shaped pattern, said tear ways adapted to tear and form at least two air bag release doors for releasing the air bag while leaving part of the peripheral area of the upper wall outside of the break-open area connected to the side wall when the air bag is expanded, said tear ways also defining a hinge section adapted to join said door with said side wall, said hinge section including;

a) a hinge area whereat hinging of said door occurs, said hinge area being of a thinner thickness as compared to said door and b) a thickened portion extending between said hinge area to said side wall whereat said hinge section is joined thereto, said thickened portion being adapted to prevent undesired closure tearing and to resist rotation of said door prior to the tearing action associated with opening of said closure having advanced to the end of the tear way and into said hinge section.

* * * * *

UNITED STATES PATENT AND TRADEMARK OFFICE
CERTIFICATE OF CORRECTION

PATENT NO. : 5,524,922
DATED : 11 June 1996
INVENTOR(S) : Quin Soderquist

It is certified that error appears in the above-indentified patent and that said Letters Patent is hereby corrected as shown below:

Title page,
Item [54] and col. 1, line 2,
At title page, the last word of the title, "CLOUSURES" should be --CLOSURES--.

At column 4, line 63, "DESCRIPTION OR" should be --DESCRIPTION OF--.

At column 11, line 66, "Understood therefrom," should be --understood therefrom,--.

At column 12, line 34, "claim 14" should be --claim 1--.

Signed and Sealed this

Fourteenth Day of January, 1997

Attest:

BRUCE LEHMAN

*Attesting Officer*      Commissioner of Patents and Trademarks